(12) United States Patent
Majumdar

(10) Patent No.: US 7,128,799 B2
(45) Date of Patent: Oct. 31, 2006

(54) METHOD OF MANUFACTURING PRECURED TREAD WITH REFLECTIVE GROOVES

(75) Inventor: Ramendra Nath Majumdar, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 249 days.

(21) Appl. No.: 10/315,754

(22) Filed: Dec. 6, 2002

(65) Prior Publication Data

US 2004/0108035 A1     Jun. 10, 2004

(51) Int. Cl.
*B29C 65/70*   (2006.01)
*B29C 43/18*   (2006.01)
*B29C 43/20*   (2006.01)
*B29D 30/52*   (2006.01)
*B60C 11/00*   (2006.01)

(52) U.S. Cl. ............... 156/245; 152/209.5; 152/209.6; 152/209.18; 156/114; 156/298; 264/247; 264/275; 264/277; 264/278

(58) Field of Classification Search ............ 152/209.5, 152/209.6, 209.18; 156/297, 298, 114, 245; 264/247, 275, 277, 278
See application file for complete search history.

(56) References Cited

U.S. PATENT DOCUMENTS

| | | | |
|---|---|---|---|
| 3,382,908 A | | 5/1968 | Palmquist |
| 3,946,782 A | | 3/1976 | Petrasek et al. |
| 5,055,347 A | * | 10/1991 | Bacon, Jr. .................... 442/295 |
| 5,709,830 A | * | 1/1998 | Triantafyllis .................. 156/96 |
| 5,988,248 A | * | 11/1999 | Sandstrom ........... 152/DIG. 12 |
| 6,089,290 A | * | 7/2000 | Chlebina et al. ......... 152/209.6 |
| 6,286,573 B1 | * | 9/2001 | Hine ....................... 152/209.5 |
| 2002/0053380 A1 | * | 5/2002 | Oyamada ................. 152/209.6 |
| 2002/0170645 A1 | * | 11/2002 | Norwood et al. ........... 156/114 |

FOREIGN PATENT DOCUMENTS

| | | | |
|---|---|---|---|
| CA | 2212021 | * | 7/1998 |
| DE | 3924459 | * | 3/1990 |
| DE | 9102607.5 | * | 7/1991 |
| DE | 29607231 | * | 7/1996 |
| EP | 713901 | * | 5/1996 |
| GB | 2021478 | * | 12/1979 |
| JP | 8-300512 | * | 11/1996 |

OTHER PUBLICATIONS

Machine translation for Europe 713901.*

* cited by examiner

*Primary Examiner*—Steven D. Maki
(74) *Attorney, Agent, or Firm*—Bruce J. Hendricks; Alfred D. Lobo

(57) ABSTRACT

A laminar "precured" or "replacement" tread for wheeled vehicles operating at night on retreaded tires is made more readily visible when grooves in the tires are provided with elastomeric strips or bands in which are embedded retroreflective elements such as transparent glass or synthetic resinous microspheres (referred to herein as "beads"). Upper surfaces of longitudinal ridges in a flat curing mold lend themselves to supporting the strips which are then precisely positioned in grooves defined by the ridges, when the flat tread is cured.

1 Claim, 4 Drawing Sheets

METHOD OF MANUFACTURING PRECURED TREAD WITH REFLECTIVE GROOVES

FIELD OF THE INVENTION

Manufacture of cured, also referred to as "precured" or "replacement" treads, referred to as "precured retreads" because the tread (or "retread") is cured before it is secured to a carcass of a tire to be retreaded. Wheeled vehicles operating at night on retreaded tires are more readily visible when grooves in the tires are provided with reflective light-colored material in the grooves, however it is provided. It is well known that, during curing, the combination of aromatic oil and antiozonants in tread compounds are notable for their staining power in non-black rubber compounds so that if the desired color is stained, the original color is sacrificed. Such compounds used in precured treads ("retread compounds") are distinct from compounds used in "non-staining" compositions for sidewalls commonly used in automobile tires. Therefore, in the prior art, retreaded tires have been provided with elastomeric strips or bands with little or no concern for their actual immunity to degradation by staining compounds, in which bands are embedded reflex-reflective or retro-reflective elements such as transparent glass or synthetic resinous microspheres (referred to herein as "beads"). For the purposes of the invention herebelow the distinction between reflex-reflective and retro-reflective strips is immaterial; typically, strips are used which reflect most of the light in a narrow zone, and are therefore deemed to be retro-reflective.

The Problem: The staining suffered by fluorescent, phosphorescent or reflective paints coated directly on the floor of a valley between grooves of a tread due to migration of staining ingredients, had to be recognized. The very property which allows a strip to be colored, namely penetrability of pigment, is the property which accelerates staining. Assuming that providing a reflective coating on a barrier layer effective against penetration by staining ingredients appears straightforward, the practical difficulty of positioning an elastomeric strip coated with reflective beads in a groove of a cured tire was far more evident. Apart from such difficulty, an elastomeric substrate had to be chosen which will not only be thermally stable in the temperature range from about 140° C. to 200° C., and cohesively bondable to the tread compound when cured, but which substrate will be substantially impermeable to staining ingredients in the tread compound. If the elastomer was stained, the reflectivity of a monolayer of the beads is progressively denigrated over the life of the tire's tread because the reflectivity of the beads is directly dependent upon the reflectivity of the surface of the substrate in which the beads are embedded. The difficulty of placing a strip in a circumferential groove in a hot curing mold is even greater. It had to be realized that a conventional curing mold, used to cure a tread on a tire to be retreaded, lying open in a generally horizontal position, does not lend itself to having thin strips of elastomeric material securely inserted in circumferentially continuous grooves lying in the vertical plane in the female portion of the mold, especially when the mold is hot. Manually inserting plural strips into grooves, one strip at a time, each strip being inserted only a few centimeters at a time until secured around the entire periphery of the hot mold, is impractical and not reasonable. Only a flat mold used for curing a green retread lends itself to curing the strip so that it will be substantially precisely positioned and bonded in the valley of a groove of a precured retread.

BACKGROUND OF THE INVENTION

The additional safety provided by reflective elements on tires is well known. Such elements are provided on the sidewalls of tires to make a vehicle more readily identifiable in a side view at night; and in the grooves of tires to make a vehicle more readily identifiable in an end view at night. This invention is directed to reflective circumferentially continuous grooves in the tread of a tire, to provide better visibility and cosmetic enhancement over and above that provided by tail lights on a vehicle, and especially directed to retreaded tires used on large trucks.

U.S. Pat. No. 3,946,782 to Petrasek et al provides reflective elements in adjacent circumferential grooves of a tread so they provide an indication of the speed at which the tire is rotating—a particularly helpful feature at night when a person with impaired depth perception has difficulty estimating the speed of approaching or retreating lights mounted on a vehicle. Though they state that "These reflective elements are preferably molded into the tire during the vulcanizing or curing operation.", and "Great care must be taken in this method so that the reflective elements are properly located on the external surface of the green tire to correspond with the desired locations in the molded, cured product;", they failed to disclose how one might position a strip in the grooves of a hot mold. They also failed to realize that it was critically important to isolate the reflective elements from the tread surface with an effective barrier layer. This oversight is confirmed by the disclosure that "Alternatively, the reflective elements may be placed on the protrusion of the mold itself (sic)" and "The reflective elements will be transferred to and vulcanized to the finished product during the curing operation." (col 3, lines 54–67). Clearly there is no suggestion how one might position a bead-coated strip, bead side against the hot vertical circular face of a "protrusion" of the mold (of the male portion of the mold which will form a groove) and have the strip remain in position. The statement that "Possibly, the elements may also be cemented onto the finished tire after it has been molded." (col 4, lines 3–4) ignores the fact that it is impractical to do this by any known method, and if done, there is no disclosure as to what type of adhesive will keep the strip securely in place when the tire is on a vehicle travelling at high speed on a highway.

Aside from dealing with the problem of staining, one skilled in the art will appreciate that cementing elastomeric strips into the valleys of grooves in a cured tire is impractical. Equally impractical is trying to secure strips in the circumferential grooves of a typical tire retreading mold lying open in a generally horizontal plane (so that the tread lies in a generally vertical plane), the mold being in a curing press, as the strip is easily displaced when the green retread is cured. By "displaced" is meant that the strip does not lie flat on the floor of the valley of the groove and portions of the strip are forced over onto the sides of one or the other opposed walls of the groove, asymmetrically, usually on the lower surface of one or the other walls.

U.S. Pat. No. 3,382,908 to Palmquist et al discloses a tire on which glass beads are cured to the sidewall using a laminate of neoprene and disclosing various other vulcanizable materials none of which is identified as being impermeable to staining-components present in the rubber of the sidewall. Staining is not a severe problem in a sidewall compound; many sidewall compositions are non-staining. They also state "However, reflective treatments using reflex-reflective elements embedded in rubber, such as neoprene, natural and styrene-butadiene rubber, exhibit useful but less durable properties." (see col 5, lines 57–60).

Though the glass beads on the sidewall are stated to be abrasion resistant and relatively durable, they are nevertheless subject to damage when the sidewall scuffs a curb. Commonly available substrates, in which retroreflective glass beads are embedded, are relatively degradable in direct sunlight, such degradation being due to staining. Since the sidewall of a tire is exposed to far more direct sunlight than the valleys in the grooves of a tread it is more susceptible to uv degradation.

Still further, when muddied or coated with road dust, the glass beads on a sidewall are not self-washing unless the tires are run through water deep enough to bury the sidewalls; so muddied glass beads on sidewalls must be washed, as is typically done in a "car wash". There is no suggestion that the strip be placed in the valleys of grooves in a tread where the strip is susceptible to staining by ingredients in a "retread compound", and Palmquist et al were evidently unaware of the pitfalls and advantages of so doing. Pitfalls include positioning the strip in the curing mold so it is molded substantially precisely in a groove, and choosing a thermally stable, non-staining elastomer for a substrate; advantages include having the strip protected against damage by direct sunlight and abrasion when tires are run on hard pavement, as large trucks usually are, and having a strip which is self-washing.

SUMMARY OF THE INVENTION

A substantially laminar green tread (or "retread") is co-cured with at least one elastomeric strip of a polymer which is stable at a temperature in the range from about 140° C. to 200° C. and pressure in the range from about 790 KPa (100 psig) to 2170 KPa (300 psig) during the time, about 8 min to 20 min, the tread is cured; the strip is densely coated with reflective microspheres or beads, typically of transparent glass; the strip is substantially precisely positioned on the upper surface of the lower portion of a longitudinal, substantially continuously linear ridge of a flat tread mold held open in a generally horizontal position; when the mold is closed and the tread is cured, the ridge molds a groove in which the strip is substantially precisely, non-removably, cohesively bonded to the floor of the valley of the groove, also referred to as being cohesively bonded "in the valley".

By "precisely" is meant that the strip is visually symmetrically disposed about the longitudinal centerline of a valley of the groove, and secured to the floor of the valley, conforming to the surface of the floor; if the strip is wider than the floor of the valley, then opposed portions of the strip, which portions are forced onto opposed walls of the groove, are symmetrically disposed about the longitudinal centerline of the valley. The height to which the opposed portions of the strip may rise on opposed walls may correspond to the maximum allowable tread depth at which the tire may be safely operated, thus functioning as a "warning" when lugs of the tread are worn down to the upper edges of the vertically extending sides of the strip. Thus, in addition to curing the strip in the valley so that it is not removed even at high speeds, precision in securing the strip to the floor of the valley is essential.

At least one groove in a flat pre-cured tread for a tire carcass has a strip of a single barrier layer of thermally stable, vulcanizable rubber which is substantially impermeable to staining ingredients migrating from the cured tread rubber; or the strip may be a dual-layer laminate of two thermally stable synthetic resinous materials, the upper layer being densely coated with reflective beads, and at least the lower barrier layer being compounded of a vulcanizable rubber which is substantially impermeable to staining ingredients migrating from the cured tread rubber. Whether single or dual-layer, the thickness of the strip is less than 1 mm, preferably less than 0.05 mm (2 mils) thick, yet provides an effective barrier against staining ingredients from the tread. The strip is adhesively non-removably secured in the valleys of grooves; clean glass beads reflect light, making the tire visible on a vehicle operating at night, but muddied glass beads are not reflective. But they have the unexpected property of being self-cleanable; muddied beads are able to stay clean because the tire, when operated on a wet pavement forces water into and out of the grooves and washes the beads; the modulus of the stretchable strip is chosen to substantially match that of the retread compound. The beads on the strip remain adhered to the strip despite the deformation inherent in a retreaded tire subjected to an essentially instantaneous transition from compression to tension when rolling down the road; and the composition of the lower barrier layer is a vulcanized rubber-based material essentially impermeable to staining ingredients in the tread over the life of the tread, preferably a compound having a major proportion by weight of a halogenated, preferably brominated butyl rubber, essentially free of carbon black.

A method of manufacturing a substantially laminar pre-cured retread in a "flat" curing mold having longitudinally continuous ridges with upper surfaces to define valleys of circumferential and transverse grooves in the precured retread, is disclosed. The method comprises, positioning at least one elastomeric strip of thermally stable material, less than about 25 mm wide, on the upper surface of a ridge of a curing mold lying open in a generally horizontal plane, the strip having a dense coating of reflective, preferably retroreflective, beads on one side and a coating of a vulcanizable adhesive on the other side, the beads being in direct contact with the upper surface of the ridge; placing a substantially laminar green tread in the curing mold in contact with the strip so as to adhesively secure the strip to the green tread; closing the mold and curing the green tread; and, removing a cured tread in which the strip is cohesively bonded and the beads are precisely positioned in a valley formed by the ridge.

BRIEF DESCRIPTION OF THE DRAWING

The foregoing and additional objects and advantages of the invention will best be understood by reference to the following detailed description, accompanied with schematic illustrations of a preferred embodiment of the invention in which illustrations like reference numerals refer to like elements, and in which.

DETAILED DESCRIPTION OF A PREFERRED EMBODIMENT

Figure 1:
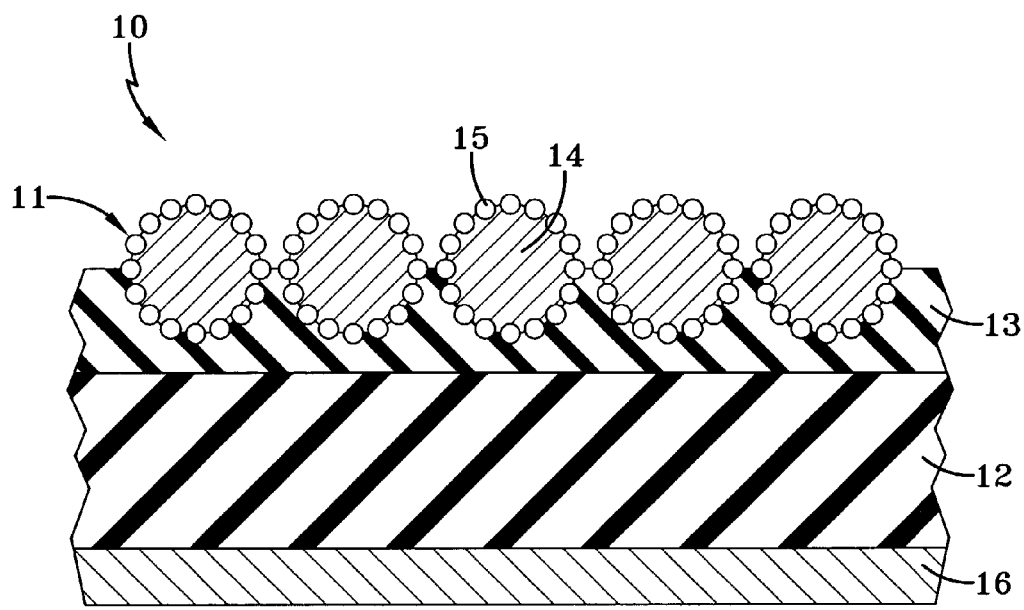
FIG. 1 is an enlarged schematic vertical cross-section through a portion of a first embodiment of a dual-layer elastomeric strip just prior to being positioned in a curing mold.

Referring to FIG. 1 there is illustrated a portion of a thin strip, less than about 25 mm wide, preferably less than 15 mm wide, referred to generally by reference numeral 10, of the type disclosed in the '908 patent. Strip 10 preferably comprises a laminate of two layers 12 and 13 of elastomeric materials, lower barrier layer 12 being a vulcanizable rubber-based material such as an isobutylene-based polymer, predominantly brominated butyl rubber optionally blended with one or more other rubbers. Chlorosulfonated polyethylene (Hypalon 20) has too high a modulus and is unsuitable. Upper layer 13 is of an elastomer, the same or different from that of the first layer, preferably of neoprene, natural and styrene-butadiene rubber, in which layer 13 retroreflective aggregates 11 are non-removably embedded; each aggregate consists of a rigid core 14 around which a monolayer of transparent glass beads 15 is bonded to provide minute light-reflecting layers under the beads. The beads have an average diameter in the range from about 40 µm to about 200 µm and have a refractive index in the range from about 1.9 to 2.3. Such high refractive index is obtained when the rear surfaces of the beads are coated with a vacuum-deposited or vapor-coated metal coatings, such as of aluminum or silver. Strips 10 are commercially available from 3M Company and may be produced with particular detailed specifications for each element of the strip, such specifications being directed to meeting the requirements of a strip for a particular application.

The reflectivity of the beads prior to the strip being cured in the tread is typically in the range from 6 to 10; and in the range from 5.5 to 9.5 after the strip is cured in the tread, as read by an Erichsen Pico Glossmeter Model 500, the calibration plate for which has a gloss reading of 93. It is seen that there is substantially no loss of reflectivity upon co-curing the strip in the tread.

In the laminate used herein, each layer 12 and 13 has a modulus matched to that of the cured tread compound in a tire in which the strip is to be used, that is within ±100% of the modulus of the cured tread, it being recognized that there is more latitude on the lower side of the specification than the higher, and the more closely matched the better, ±50% being preferred for best results. The overall thickness of strip 10 is in the range from about 0.01 mm to about 1 mm and its width is substantially the same as that of the groove in which it is to be cured. Upper layer 13 is thick enough to partially embed the monolayer of aggregates but thinner than the lower layer which is typically less than 0.5 mm thick.

The lower surface of layer 12 is covered with a vulcanizable adhesive 16 which when cured in the tread, produces a cohesive bond therewith. By cohesive bond is meant that attempting to remove the bonded layer from the cured tread does not result in a separation of the layer at the interface with the tread, but results in tearing of either the layer or the tread.

Figure 2:
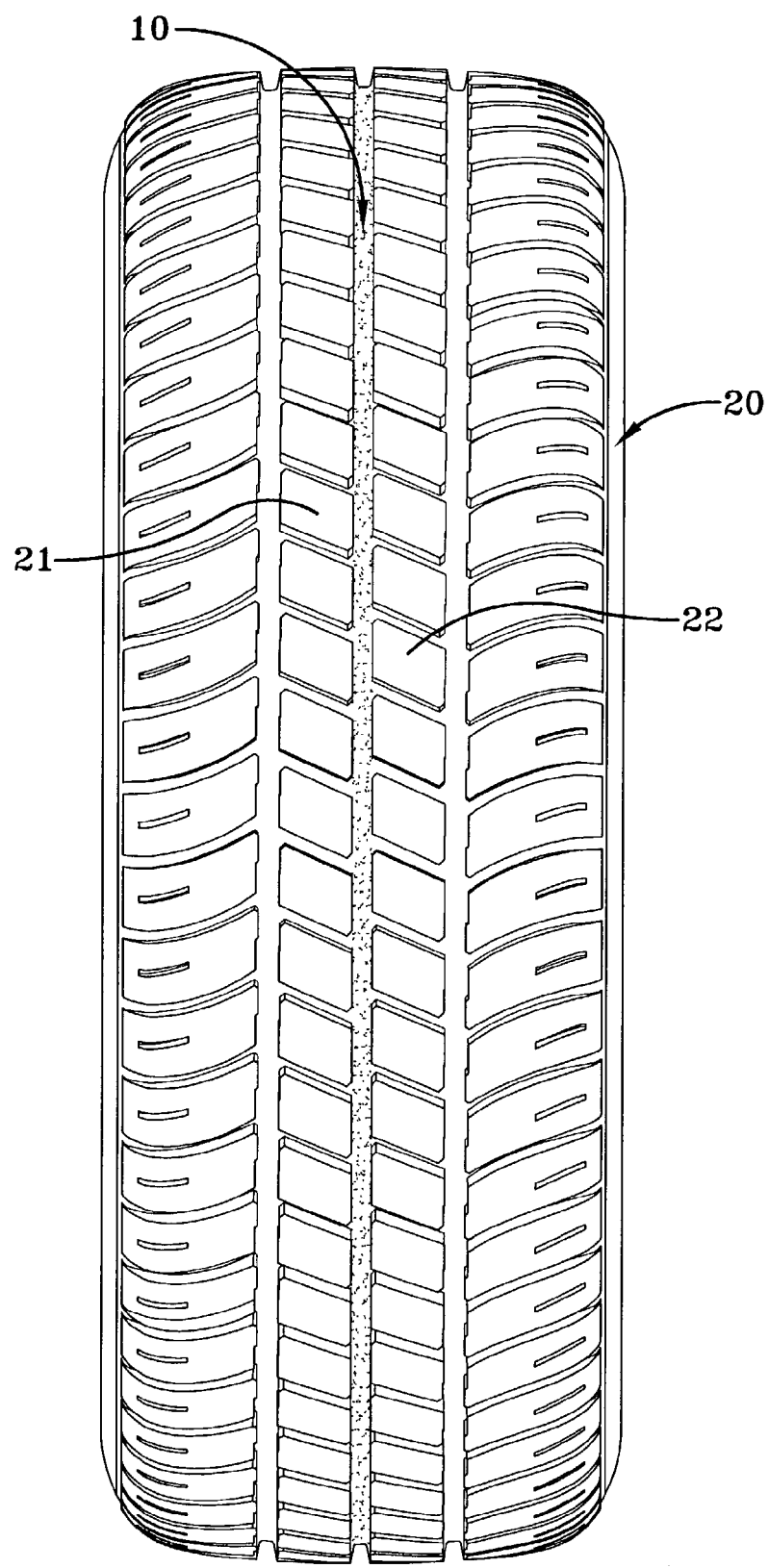
FIG. 2 is a perspective view, not to scale, of a tire carcass on which a cured tread is adhesively secured and vulcanized in a curing mold.

Referring to the FIG. 2 there is shown a carcass of a tire referred to generally by reference numeral 20 having a tread in which lugs 21 and 22, 22 and 23, 23 and 24 define circumferential grooves 25, 26 and 27 respectively. Consecutive lugs 21, 22, 23 and 24 define four sets of transverse grooves spaced-apart across the tread, only one 28 of which sets, between consecutive lugs 21, is identified. The depth of each circumferential groove, measured from the upper surface of a lug 21 or 22 to the floor of the valley is in the range from about 2 cm to 3 cm for an automobile tire and from about 2 cm to about 4 cm for a truck tire.

Cured in each of the circumferential grooves is a strip 10 (only one is shown) having an overall thickness in the range from about 0.5 mm to about 2 mm and a width substantially the same as that of the groove so that the strip is snugly held between opposed walls of adjacent lugs 21 and 22.

Figure 3:
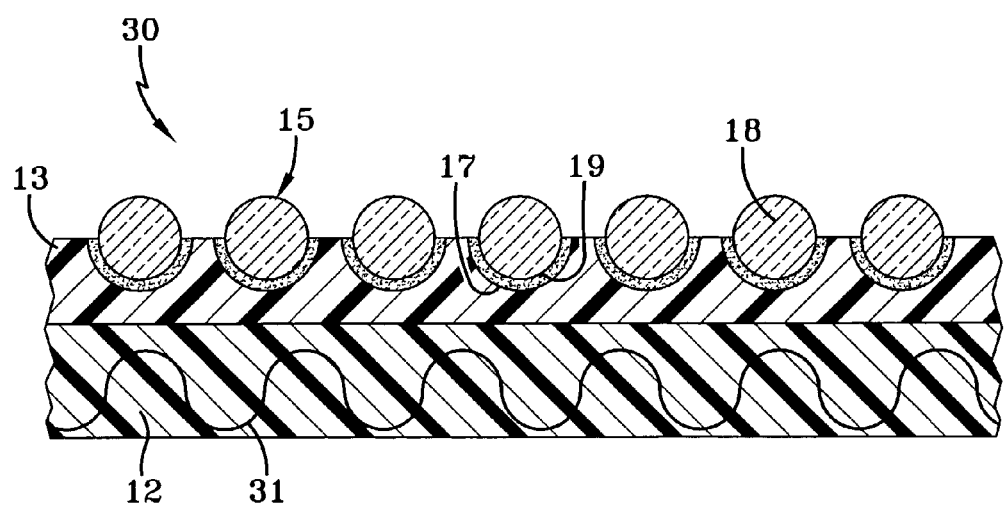
FIG. 3 is an enlarged schematic vertical cross-section through a portion of a second embodiment of a dual-layer elastomeric strip; the reinforcing web is substantially completely embedded within the support layer.

Referring to FIG. 3 there is shown a preferred embodiment of a strip referred to generally by reference numeral 30, of the type disclosed in U.S. Pat. No. 5,055,347 to Bacon et al. also available from 3M Company with particularly specified physical properties. Strip 30 is of the same thickness as strip 10, and made from the same elastomer. Beads 15 are partially embedded in upper layer 13 which may be of a compound different from that of lower layer 12. Front surfaces 18 of the beads protrude from the surface of layer 13; the rear surfaces 19 of the beads are provided with specular reflectors 17. Among the materials used for this purpose are vacuum-deposited or vapor-coated metal coatings, such as of aluminum or silver. A non-porous reinforcing web 31 is substantially completely embedded in lower layer 12 and preferably extends substantially throughout to enhance such protection against penetration of staining ingredients as is provided by the lower layer 12. Typical staining ingredients include aromatic oils, antiozonants, carbon black, processing aids, chemicals in a curing package, other oils and coupling agents, which either individually or in combination, one with another, generate compounds which migrate over the surface of the beads, diminishing their retroreflectivity. When this is diminished more than 50%, and washing with water fails to improve the reflectivity substantially, the visibility of the strip at night is deemed unacceptable.

Figure 4:
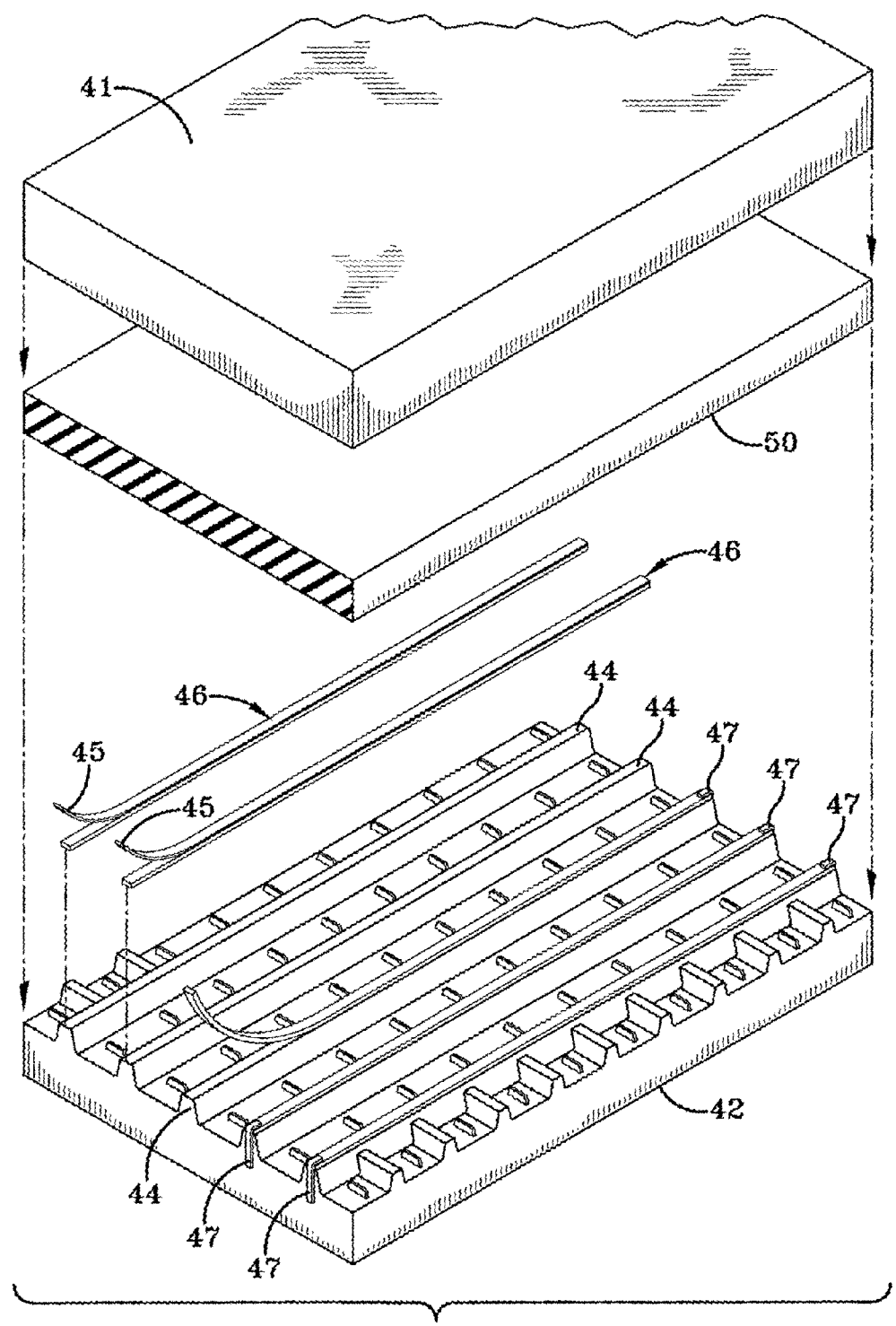
FIG. 4 is an exploded view schematically illustrating, not to scale, a green tread between the upper and lower portions of an elongated flat mold for curing a flat green tread with two strips just prior to being positioned on ridges of the lower portion, and three strips after they have been positioned.

Referring to Fig 4 is a perspective view of the upper and lower portions 41 and 42 respectively of a flat curing mold in which a laminar strip of green tread 50 is to be cured. Ridges 44 run longitudinally over the length of the mold so as to form parallel grooves in the strip of green tread when the tread is cured. After the backing (release paper) 45 is removed, bead-coated strips 46 are placed, beads down, on the upper faces of the ridges and opposed ends of the strips are manually taped to the hot mold with heat-resistant tape 47 so that the strips, once taped in position, do not move.

Figure 5:
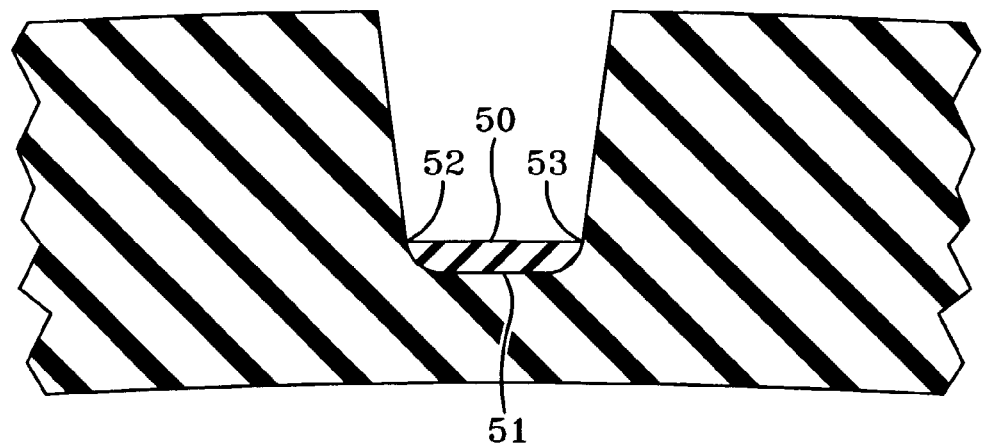
FIG. 5 is a cross-sectional view, greatly enlarged, of a beaded strip substantially the same width as the groove, precisely disposed on the floor of the valley of a groove.

In the cross-sectional view illustrated in FIG. 5, a beaded strip 50, 14.75 mm wide is shown coextensively contacting the floor of the valley 51 which is 15 mm wide, the edges of the strip in the opposed corners 52, 53 of the groove.

Figure 6:
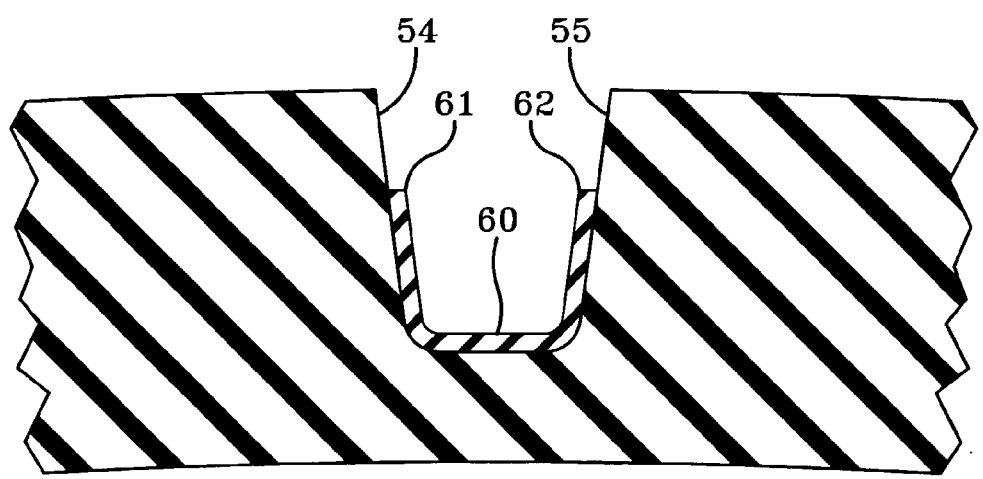
FIG. 6 is a cross-sectional view, greatly enlarged, of a beaded strip having a width greater than that of the groove, precisely disposed on the floor of the valley of a groove, the sides of the strip functioning as a depth gauge for the tread.

In the cross-sectional view illustrated in FIG. 6, a beaded strip 60, 21.5 mm wide is shown coextensively contacting the floor of the valley which is 15 mm wide, and the edges 61, 62 of the strip rise about 6.35 mm in coextensive contact along the opposed substantially vertical walls 54, 55 of the groove.

Inserting Strip in Doughnut-shaped Curing Mold:

A doughnut-shaped retread mold for a truck tire has 2 continuous circumferentially substantially linear grooves, tapered downwardly over a depth of about 25 mm, to produce a groove about 20 mm wide at the tread's surface and about 15 mm wide on the valley's floor. A glass-beaded strip 14.75 mm wide and 0.0254 mm (1 mil) thick is manually inserted by overlaying the strip between lugs and pushing down on it with the edge of a dull flat spatula until the strip is inserted in the groove around the entire periphery of the hot curing mold. The tread on the tire is then cured for 8 min at 150° C. and the position of the strip in the groove examined. The strip is displaced in the groove, and is not precisely positioned as required.

Inserting Strips in a Flat Curing Mold:

A flat retread mold for the same truck tire has 2 substantially linear ridges to define grooves having the same dimensions as before. Glass-beaded strips, each 14.7 mm wide and 0.0254 mm (1 mil) thick are placed on the upper surface of each of the 2 ridges extending over the length of the mold, one strip on each ridge, with the beads in contact with the upper surface of the ridge. The green tread is then placed on the mold to adhesively secure the strips to the green tread. The flat mold is closed and the tread is then cured for 8 min at 150° C. and the position of the strip in the groove examined. The test is repeated with 20 tires. Every one of the strips in the 20 treads was correctly positioned in the valley of the groove. The average time to tape each strip in position is less than 10 secs.

Staining Tests:

In the following tests to determine resistance to staining from ingredients in cured tread made from a compound commonly used for truck tires. All treads are made from the same tread compound, the composition of which is as follows:

| Ingredient | Amount, phr |
|---|---|
| SBR | 60 |
| PBD | 40 |
| Carbon black | 60 |
| Aromatic oil | 30 |
| Wingstay ® 100* antioxidant | 2 |
| Santoflex ® 6 PBD+ antiozonant | 1 |

*from Goodyear Chemical Co.
+from Flexis Corp.

Strips of various reflective materials are secured in the grooves of cured flat tire retreads and examined (i) after exposure to sunlight for one month, and (ii) after 4 years in darkness. Strips were deemed stained if the original reflectiveness was diminished more than 50%, as determined by an Erichsen Pico Glossmeter Model 500, the calibration plate for which has a gloss reading of 93. The results are as follows:

| Reflective material | (i) sunlight, 1 mo | (ii) Dark, 4 yr |
|---|---|---|
| Fluorescent Paint[1] in valley | Stained | Stained |
| Phosphorescent coating[2] in valley | Stained | Stained |
| Reflective paint[3] in valley | Stained | Stained |
| Strip with glass beads[4] | Not* stained | Not Stained |

[1]M-300 obtained from Dayglo Corp.
[2]6SSU obtained from United Mineral Corp.
[3]experimental reflective paint from Lord Corp.
[4]made to specifications by 3M Company
*slight staining does not substantially affect retroreflection - is easily washed off Though the effect on the glass beaded strip of sunlight after exposure for 1 month is noticeable, reflectiveness having diminished about 10%, it is to be noted that the tests were conducted on flat retreads. When the glass-beaded strip is cured into the grooves of a typical truck tire in which the walls of the lugs range from about 1.75 cm to 3.5 cm high, the strip being on a tire under the truck, is relatively well-protected against exposure to direct sunlight and more than 50% of the original reflectivity should remain after the operating life of the tread expires, typically 1 year for a truck in regular use.

Self-cleaning Ability of Beaded Strip in Tread Grooves:

To simulate washing of grooves in the tread of a retreaded tire rolling through road dirt, a green retread strip is cured in a flat mold having two parallel substantially continuously linear valleys, each 15 mm wide, in each of which a beaded strip 14.75 mm wide is cured so that the longitudinal strip is symmetrically disposed about the longitudinal centerline of the valley.

The reflectivity of the beads is measured with an Erichsen Pico Glossmeter Model 500, the calibration plate for which has a gloss reading of 93. The average of 7 readings at different locations in the grooves of the tread is used. The cured retread is muddied with road dirt comprising a mixture of soil and asphalt particles, and the mud allowed to dry in the grooves. The retread strip is then washed with tap water using a nozzle at the end of a section of 1.9 cm diam (0.75 in) garden hose. The reflectivity of the beads is again measured with the glossmeter, making 7 readings at different locations in the tread grooves and the readings compared. This procedure of muddying, washing and reading the reflectivities is repeated ten (10) times. After the tenth time the reflectivity of the beads which were muddied and washed 10 times is more than 90% of the reflectivity first measured (original reflectivity), and visually indistinguishable from the original reflectivity, as seen from the resultes presented below:

| Sample | Average Gloss | Std. Deviation |
|---|---|---|
| Freshly cured, never dirtied | 7.96 | 0.39 |
| After muddied and washed 10 times | 7.35 | 0.37 |

It is evident that there is only a 5.4% reduction in the original reading.

Though the above reduction in gloss is not visually distinguishable, the change in color of the washed strips is even less noticeable, as evidenced by the readings of L-values (below) measuring change in whiteness, taken with a Hunter Ultrascan using ASTM method E308-94a. An L-value of 0 (zero) represents perfect black, and L=100 represents perfect white.

| Sample | L-value of color |
|---|---|
| Unused | 71.50 |
| Soiled & washed 10 times | 71.46 |

Having thus provided a general discussion, described the overall process of inserting retroreflective strips in grooves of a precured tread in detail, and illustrated the invention with specific examples of the best mode of carrying it out, it will be evident that the invention has provided an effective solution to a problem as well known as it is difficult.

What is claimed is:

1. A method of manufacturing a substantially laminar cured tread in a flat curing mold having plural longitudinally continuous ridges with upper surfaces adapted to define valleys of linear grooves in the cured tread, comprising, positioning an elastomeric strip of thermally stable material so as to remain in position on the upper surface of at least one ridge of the curing mold lying open in a generally horizontal plane, by taping opposed ends of the strip to the mold with heat-resistant tape, the strip having a dense coating of retroreflective micro spheres or beads on one side and a coating of a vulcanizable adhesive on the other side, the microspheres or beads being in direct contact with the upper surface of the ridge;

placing a flat substantially laminar green uncured, cohesively bondable, tread compound in the flat curing mold in contact with the strip so as to adhesively secure the strip with a vulcanizable adhesive to the green uncured tread;

closing the mold and co-curing the green uncured tread and vulcanizable adhesive; and, removing from the mold a cured flat tread in which the strip is co-cured and cohesively bonded in a valley of a linear groove of the cured tread and the microspheres or beads are substantially precisely positioned in said valley formed by the ridge of the mold.

* * * * *